US012758952B2

(12) United States Patent
Iyyamperumal et al.

(10) Patent No.: US 12,758,952 B2
(45) Date of Patent: Oct. 13, 2026

(54) ESSENTIALLY CLAY FREE FCC CATALYST WITH INCREASED CONTAMINANT RESISTIVITY, ITS PREPARATION AND USE

(71) Applicant: Ketjen Limited Liability Company, Houston, TX (US)

(72) Inventors: Eswaramoorthi Iyyamperumal, Houston, TX (US); George Yaluris, Houston, TX (US); Darrell Ray Rainer, Houston, TX (US)

(73) Assignee: Ketjen Limited Liability Company, Houston, TX (US)

( * ) Notice: Subject to any disclaimer, the term of this patent is extended or adjusted under 35 U.S.C. 154(b) by 124 days.

(21) Appl. No.: 18/250,371

(22) PCT Filed: Oct. 29, 2021

(86) PCT No.: PCT/US2021/057395
§ 371 (c)(1),
(2) Date: Apr. 25, 2023

(87) PCT Pub. No.: WO2022/094306
PCT Pub. Date: May 5, 2022

(65) Prior Publication Data

US 2023/0415133 A1 Dec. 28, 2023

Related U.S. Application Data

(60) Provisional application No. 63/107,961, filed on Oct. 30, 2020.

(51) Int. Cl.

| | |
|---|---|
| ***B01J 29/06*** | (2006.01) |
| ***B01J 21/04*** | (2006.01) |
| ***B01J 21/08*** | (2006.01) |
| ***B01J 37/04*** | (2006.01) |
| ***C10G 11/04*** | (2006.01) |
| *B01J 35/38* | (2024.01) |
| *B01J 35/70* | (2024.01) |

(52) U.S. Cl.
CPC ............... *B01J 29/06* (2013.01); *B01J 21/04* (2013.01); *B01J 21/08* (2013.01); *B01J 37/04* (2013.01); *C10G 11/04* (2013.01); *B01J 35/38* (2024.01); *B01J 35/70* (2024.01); *B01J 2235/15* (2024.01); *C10G 2300/1003* (2013.01); *C10G 2300/1014* (2013.01); *C10G 2300/1018* (2013.01)

(58) Field of Classification Search
CPC ............................ B01J 29/06; B01J 21/04–12
See application file for complete search history.

(56) References Cited

U.S. PATENT DOCUMENTS

| | | | | |
|---|---|---|---|---|
| 11,427,764 | B2 | 8/2022 | Sabahi et al. | |
| 12,083,501 | B2 | 9/2024 | Sabahi et al. | |
| 2008/0293561 | A1* | 11/2008 | Long | B01J 29/06 502/67 |
| 2018/0371332 | A1* | 12/2018 | Cooper | C10G 11/18 |
| 2020/0338536 | A1 | 10/2020 | Sabahi et al. | |
| 2021/0268486 | A1* | 9/2021 | Yuan | B01J 37/06 |

FOREIGN PATENT DOCUMENTS

| | | | | |
|---|---|---|---|---|
| WO | 02098563 | A1 | 12/2002 | |
| WO | 2006067154 | A1 | 6/2006 | |
| WO | 2019140223 | A1 | 7/2019 | |
| WO | WO-2019140249 | A1 * | 7/2019 | B01J 35/66 |

OTHER PUBLICATIONS

PCT/US2021/057395 International Search Report of the International Searching Authority, Date Mailed Feb. 21, 2022.
PCT/US2021/057395 Written Opinion of the International Searching Authority, Date Mailed Feb. 21, 2022.
PCT/US2021/057395 International Preliminary Report on Patentability of the International Searching Authority, Date May 2, 2023.
Salemo, et. al., Combating the Negative Effects of Iron in the FCCI at Philadelphia Energy Solutions Refining and Marking, LLC, AFPM Annual Meeting Mar. 13-15, 2016.
Rainer, D.R. et. al., Novel lab-scale deactivation method for FCC catalyst: inducing realistic accessibility responses to iron poisoning Applied Catalysis A: General 249 (2003) 69-80.

* cited by examiner

*Primary Examiner* — Matthew E. Hoban

(57) ABSTRACT

Process for the preparation of a particulate FCC catalyst and a particulate FCC catalyst increased contaminants resistivity being essentially free of clay. Thus, in one embodiment, provided is a particulate FCC catalyst composition comprising one or more zeolites, at least one alumina component, at least one silica component, and being essentially free of clay. In a further embodiment, it is provided a particulate FCC catalyst composition comprising at least two different types of alumina and at least one silica component and being essentially free of clay. The alumina components can be selected from the group of peptizable quasicrystalline boehmite, non-peptizable microcrystalline boehmite phase, non-peptizable alpha phase or non-peptizable alumina containing gamma phase or non-peptizable alumina containing chi phase or gibbsite alumina. The silica component can be selected from the group of low sodium stabilized colloidal silica and acid or low sodium or ammonia stabilized colloidal silica or ploy silicic acid.

8 Claims, No Drawings

ESSENTIALLY CLAY FREE FCC CATALYST WITH INCREASED CONTAMINANT RESISTIVITY, ITS PREPARATION AND USE

CROSS-REFERENCE TO RELATED APPLICATIONS

This application, filed Oct. 29, 2021, under 35 U.S.C. § 119(e), claims the benefit of U.S. Provisional Patent Application Ser. No. 63/107,961, filed Oct. 30, 2020, entitled "ESSENTIALLY CLAY FREE FCC CATALYST WITH MULTIPLE ALUMINA, ITS PREPARATION AND USE," the entire contents and substance of which are hereby incorporated by reference as if fully set forth below.

FIELD OF THE INVENTION

The present invention pertains to a catalyst composition and its use in a process for the cracking or conversion of a feed, such as, for example, those obtained from the processing of crude petroleum or a blend of >0 wt % of vegetable oils (soya bean, canola, corn, palm, rape seed, etc.), waste oils, tallow, biowaste, and/or pyrolysis oil derived by any thermal treatment of biomass or plastics, showing an increase in contaminant resistivity.

BACKGROUND

A common challenge in the design and production of heterogeneous catalysts is to find a good compromise between the effectiveness and/or accessibility of the active sites and the effectiveness of the immobilising matrix in giving the catalyst particles sufficient physical strength, i.e. attrition resistance. In particular, FCC catalysts will become "poisoned" by contaminants, such as iron, Ca, P, Mg and Si over time. For brevity we will refer to Fe and Ca poisoning in this specification, but it should be understood that this includes other contaminants in the FCC feed causing the same effects. Poisoning of FCC catalysts by Fe, Ca and other contaminants containing feedstocks is a well-known problem that severely affects the accessibility, fluidization, activity and bottoms upgrading ability of catalyst. Bottoms cracking ability of an FCC catalyst is one of the most critical performance requirements as it converts the low value heavier molecules into value added products. Iron poisoning has been known, but the introduction of tight oil has brought this issue to the forefront. The iron and calcium poisoning leads to surface blockage by vitrification and surface nodule formation that directly affects the activity and bottoms upgrading. The catalysts with improved tolerance allow the customers to process cheaper high Fe/Ca containing feedstocks.

WO 02/098563 discloses a process for the preparation of an FCC catalyst having both a high attrition resistance and a high accessibility. The catalyst is prepared by slurrying zeolite, clay, and boehmite, feeding the slurry to a shaping apparatus, and shaping the mixture to form particles, characterised in that just before the shaping step the mixture is destabilised. This destabilisation is achieved by, e.g., temperature increase, pH increase, pH decrease, or addition of gel-inducing agents such as salts, phosphates, sulphates, and (partially) gelled silica. Before destabilisation, any peptizable compounds present in the slurry must have been well peptized.

WO 06/067154 describes an FCC catalyst, its preparation and its use. It discloses a process for the preparation of an FCC catalyst having both a high attrition resistance and a high accessibility. The catalyst is prepared by slurrying a clay, zeolite, a sodium-free silica source, quasi-crystalline boehmite, and micro-crystalline boehmite, provided that the slurry does not comprise peptized quasi-crystalline boehmite, b) adding a monovalent acid to the slurry, c) adjusting the pH of the slurry to a value above 3, and d) shaping the slurry to form particles.

WO 19/140223 describes an FCC catalyst, its preparation and use. It discloses a process for the preparation of a catalyst and a catalyst comprising more than one silica. The catalyst is disclosed as a particulate FCC catalyst comprising about 5 to about 60 wt % one or more zeolites, about 10 to about 45 wt % quasi-crystalline boehmite (QCB), about 0 to about 35 wt % microcrystalline boehmite (MCB), greater than about 0 to about 15 wt % silica from sodium stabilized colloidal silica, greater than about 0 to about 30 wt % silica from ammonia stabilized or lower sodium colloidal silica, and the balance clay and the process for making the same.

BRIEF DESCRIPTION OF THE INVENTION

The present invention relates to an FCC catalyst meant to be employed in the process for cracking, a feed over a catalyst composition to produce conversion product hydrocarbon compounds of lower molecular weight than feed hydrocarbons, e.g., product comprising a high gasoline fraction. In addition, the feedstock may include a blend of hydrocarbon feedstock and >0 wt % of vegetable oils (soya bean, canola, corn, palm, rape seed, etc.), waste oils, tallow, biowaste and/or pyrolysis or other oils (e.g., Fischer Tropsch liquids) derived by any thermal or other treatment of biomass, plastics, sewage, municipal waste, agriculture waste, or other suitable organic mass waste and combinations thereof. A unique feature of the invention is that the catalyst is essentially free of clay.

Without being bound by a particular theory, it is believed that the mobile silica present in the clay is responsible for the surface blockage and nodule formation by forming a low melting eutectic phase with added iron, calcium, sodium and/or other contaminants from feed that covers the external surface of FCC catalyst. Replacing mobile silica containing clay with alumina-based components found to improve the iron tolerance of the resulting catalyst. Since the silica in the zeolites is assumed as not mobile, clay is believed to be the main source of mobile silica. Alumina based components are not mobile, therefore it is believed that the formation of low melting eutectic phase (glassy layer) by reacting with iron and sodium is inhibited. Different aluminas such as boehmite, gamma alumina, alpha alumina, chi alumina, gibbsite, and aluminum tri-hydroxide were used to replace the clay. Binder silicas were used to improve the attrition of these essentially clay free catalysts. The current invention is an essentially clay free catalyst that has improved contaminant tolerance as indicated by higher accessibility retention after deactivation with iron. Higher bottoms upgrading in performance testing reflect the benefit of improved iron tolerance of essentially clay free catalysts.

Thus, in one embodiment, provided is a particulate FCC catalyst composition comprising one or more zeolites, at least one alumina component, at least one silica component, and being essentially free of clay. In a further embodiment, it is provided a particulate FCC catalyst composition comprising at least two different types of alumina and at least one silica component and being essentially free of clay. The alumina components can be selected from the group of peptizable quasicrystalline boehmite, non-peptizable microcrystalline boehmite phase, non-peptizable alpha phase or non-peptizable alumina containing gamma phase or non-peptizable alumina containing chi phase or gibbsite alumina. The silica component can be selected from the group of low sodium stabilized colloidal silica and acid or low sodium or ammonia stabilized colloidal silica or ploy silicic acid. Therefore, the catalyst is generally a particulate FCC catalyst composition comprising one or more zeolites, at least one alumina component, at least one silica component, and being essentially free of clay. It is preferred that the particulate composition is an FCC catalyst comprising about 1 to about 50% one or more zeolites, about 1 to about 45 wt % quasicrystalline boehmite, about 1 to about 45 wt % microcrystalline boehmite, greater than about 0-40 wt % non-peptizable alumina comprising gamma or alpha or chi phase alumina or gibbsite, about 1 wt % to about 20 wt % sodium stabilized silica, and about 0-20 wt % low sodium or acid or ammonia stabilized colloidal silica or poly silicic acid and essentially free of clay.

In a still further embodiment, provided is a process for cracking a feedstock said process comprising the steps of:

a) providing a particulate FCC catalyst composition comprising one or more zeolites, at least one alumina component, at least one silica component, and being essentially free of clay;
b) contacting the FCC catalyst with said feedstock at a temperature in the range of from 400 to 650° C., with a dwell time in the range of from 0.5 to 12 seconds.

The feedstock can be a hydrocarbon feedstock or a blend of hydrocarbons and vegetable oils (soya bean, canola, corn, palm, rape seed, etc.), waste oils, tallow, biowaste and/or pyrolysis or other oils (e.g., Fischer Tropsch liquids) derived by any thermal or other treatment of biomass, or plastics, sewage, municipal waste, agriculture waste, or other suitable organic mass waste and combinations thereof.

These and still other embodiments, advantages and features of the present invention shall become further apparent from the following detailed description, including the appended claims.

DETAILED DESCRIPTION OF THE INVENTION

Unless otherwise indicated, weight percent (e.g., 1-10 wt %) as used herein is the dry base weight percent of the specified form of the substance, based upon the total dry base weight of the product for which the specified substance or form of substance is a constituent or component. It should further be understood that, when describing steps or components or elements as being preferred in some manner herein, they are preferred as of the initial date of this disclosure, and that such preference(s) could of course vary depending upon a given circumstance or future development in the art.

General Procedure

In the first step of the process of manufacturing, for example, typically the zeolite, alumina, and silica, and optional other components can be slurried by adding them to water as dry solids. Alternatively, slurries containing the individual materials are mixed to form the slurry. It is also possible to add some of the materials as slurries, and others as dry solids. Optionally, other components may be added, such as aluminium chlorohydrol, aluminium nitrate, $Al_2O_3$, $Al(OH)_3$, smectites, sepiolite, barium titanate, calcium titanate, calcium-silicates, magnesium-silicates, magnesium titanate, mixed metal oxides, layered hydroxy salts, additional zeolites, magnesium oxide, bases or salts, and/or metal additives such as compounds containing an alkaline earth metal (for instance Mg, Ca, and Ba), a Group IIIA transition metal, a Group IVA transition metal (e.g. Ti, Zr), a Group VA transition metal (e.g. V, Nb), a Group VIA transition metal (e.g. Cr, Mo, W), a Group VIIA transition metal (e.g. Mn), a Group VIIIA transition metal (e.g. Fe, Co, Ni, Ru, Rh, Pd, Pt), a Group IB transition metal (e.g. Cu), a Group IIB transition metal (e.g. Zn), a lanthanide (e.g. La, Ce), phosphorous, phosphates or mixtures thereof Δny order of addition of these compounds may be used. It is also possible to combine these compounds all at the same time.

The term "boehmite" is used in the industry to describe alumina hydrates which exhibit X-ray diffraction (XRD) patterns close to that of aluminium oxide-hydroxide [AlO(OH)]. Further, the term boehmite is generally used to describe a wide range of alumina hydrates which contain different amounts of water of hydration, have different surface areas, pore volumes, specific densities, and exhibit different thermal characteristics upon thermal treatment. Yet their XRD patterns, although they exhibit the characteristic boehmite [AlO(OH)] peaks, usually vary in their widths and can also shift in their location. The sharpness of the XRD peaks and their location has been used to indicate the degree of crystallinity, crystal size, and number of imperfections.

Broadly, there are two categories of boehmite aluminas: quasi-crystalline boehmites (QCBs) and micro-crystalline boehmites (MCBs). In the state of the art, quasi-crystalline boehmites are also referred to as pseudo-boehmites and gelatinous boehmites. Usually, these QCBs have higher surface areas, larger pores and pore volumes, and lower specific densities than MCBs. They disperse easily in water or acids, have smaller crystal sizes than MCBs, and contain a larger number of water molecules of hydration. The extent of hydration of QCB can have a wide range of values, for example from about 1.4 up to about 2 moles of water per mole of Al, intercalated usually orderly or otherwise between the octahedral layers.

Microcrystalline boehmites are distinguished from the QCBs by their high degree of crystallinity, relatively large crystal size, very low surface areas, and high densities. Contrary to QCBs, MCBs show XRD patterns with higher peak intensities and very narrow half-widths. This is due to their relatively small number of intercalated water molecules, large crystal sizes, the higher degree of crystallization of the bulk material, and the smaller amount of crystal imperfections. Typically, the number of water molecules intercalated can vary in the range from about 1 up to about 1.4 per mole of Al.

MCBs and QCBs are characterized by powder X-ray reflections. The ICDD contains entries for boehmite and confirms that reflections corresponding to the (020), (021), and (041) planes would be present. For copper radiation, such reflections would appear at 14, 28, and 38 degrees 2-theta. The exact position of the reflections depends on the extent of crystallinity and the amount of water intercalated: as the amount of intercalated water increases, the (020) reflection moves to lower values, corresponding to greater d-spacings. Nevertheless, lines close to the above positions would be indicative of the presence of one or more types of boehmite phases. For the purpose of this specification we define quasi-crystalline boehmites as having a (020) reflection with a full width at half height (FWHH) of 1.5° or greater than 1.5° 2θ. Boehmites having a (020) reflection with a FWHH of smaller than 1.5° 2θ are considered micro-crystalline boehmites. The slurry preferably comprises about 1 to about 50 wt %, more preferably about 15 to about 35 wt %, of non-peptised QCB based on the final catalyst. The slurry also comprises about 1 to about 50 wt %, more preferably about 0 to about 35 wt % of MCB based on the final catalyst.

The present particulate composition may include a third source of alumina. The third alumina is typically a non-peptizable alumina containing gamma phase or non-peptizable alumina containing alpha phase or non-peptizable alumina containing chi phase or gibbsite alumina. The present invention contains greater than about 0 to about 40 wt % non-peptizable alumina comprising gamma or alpha or chi phase alumina or gibbsite based on the final catalyst.

Gamma alumina is understood to be a transitional phase of alumina. Boehmite or pseudoboehmite can be converted to gamma alumina through the application of a heat treatment. Typically, boehmite or pseudoboehmite is treated at 500-800° C. (preferably at about 600° C.-800° C.) for a period of about 1 to about 4 hours. The gamma alumina phase is exhibited by XRD peaks at about 37.6 (311), 45.8 (400) and 67 (440) 2-theta.

Chi is a metastable phase of alumina and is non-peptizable. It has the characteristics XRD peaks of 20 values at about 37, 43, and 67 degrees. It can be obtained from thermal treatment of gibbsite alumina at moderate temperature (300-700° C.) ranges.

Gibbsite is one of the mineral forms of aluminium hydroxide and is an important ore of aluminium in that it is one of three main phases that make up the rock bauxite. The basic structure forms stacked sheets of linked octahedra. Each octahedron is composed of an aluminium ion bonded to six hydroxide groups, and each hydroxide group is shared by two aluminium octahedral. The non-peptizable gibbsite-alumina has the characteristics XRD peaks of 20 values at about 18, 20.3 and 38 degrees.

Alpha alumina is the only stable phase of alumina, which is non-peptizable. It can be obtained by high temperature (above 1000° C.) treatment of boehmite alumina. It has the characteristics XRD peaks of 20 values at about 25.5, 35, 43.5, 57.5 and 69 degrees corresponding to (012), (104), (115), (116) and (030) plane reflections.

The total amount of silica added is generally greater than about 0 to about 35 wt % based on the final catalyst. The silica component can be either a single silica or more than one silica source. A first source of silica is typically a low sodium silica source and is added to the initial slurry. Examples of such silica sources include, but are not limited to potassium silicate, sodium silicate, lithium silicate, calcium silicate, magnesium silicate, barium silicate, strontium silicate, zinc silicate, phosphorus silicate, and barium silicate. Examples of suitable organic silicates are silicones (polyorganosiloxanes such as polymethylphenyl-siloxane and polydimethylsiloxane) and other compounds containing Si—O—C—O—Si structures, and precursors thereof such as methyl chlorosilane, dimethyl chlorosilane, trimethyl chlorosilane, and mixtures thereof. Preferred low sodium silica sources are sodium stabilized basic colloidal silicas. The slurry further comprises greater than about 0 to about 30 wt % and more preferably greater than about 1 to about 20 wt % of silica from the low sodium silicon source based on the weight of the final catalyst.

A second silica source is typically a low sodium or sodium free acidic colloidal silica or ammonia stabilized silica or polysilicic acid. Suitable silicon sources to be added as a second silica source include (poly)silicic acid, sodium silicate, sodium-free silicon sources, and organic silicon sources. One such source for the second silica is a sodium stabilized or sodium free polysilicic acid made inline of the process by mixing appropriate amounts of sulfuric acid and water glass. This second addition of silica is added in an amount of greater than about 0 to 30 wt %, preferably greater than about 1 wt % to about 20 wt % and most preferably about 5 to about 20% based on the weight of the final catalyst.

If a second silica is utilized, the choice of the second silica source can have an effect on when the material is added to the slurry discussed above. If acidic colloidal silica is used, then the silica may be added at any step prior to the pH adjustment step. However, if the second silica source is a sodium stabilized or sodium free polysilicic acid, the silica should be added after the zeolite addition just prior to the pH adjustment step. In addition, due to the sodium content of the polysilicic acid it may be necessary to wash the final catalyst to remove excess sodium. It may further be necessary or desirable to calcine the final catalyst.

A unique feature of the present invention is that due to the nature of the binding properties of the above ingredients, no clay is necessary for this catalyst. Therefore, no clay is added to the slurry and the resulting catalyst is essentially free of added clay. There may be impurity level of clay without adding any clay to the slurry.

In a next step, a monovalent acid is added to the suspension, causing digestion. Both organic and inorganic monovalent acids can be used, or a mixture thereof. Examples of suitable monovalent acids are formic acid, acetic acid, propionic acid, nitric acid, and hydrochloric acid. The acid is added to the slurry in an amount sufficient to obtain a pH lower than 7, more preferably between 1 and 4.

In the next step, one or more zeolites are added. The zeolites used in the process according to the present invention preferably has a low sodium content (less than 1.5 wt % $Na_2O$), or is sodium-free. Suitable zeolites to be present in the slurry of step a) include zeolites such as Y-zeolites—including HY, USY, dealuminated Y, RE-Y, and RE-USY-zeolite beta, ZSM-5, phosphorus-activated ZSM-5, ion-exchanged ZSM-5, MCM-22, and MCM-36, metal-exchanged zeolites, ITQs, SAPOs, ALPOs, and mixtures thereof. The slurry preferably comprises 1 to about 50 wt % of one or more zeolite based on the final catalyst.

The above slurry is then passed through a high sheer mixer where it is destabilized by increasing the pH. The pH of the slurry is subsequently adjusted to a value above 3, more preferably above 3.5, even more preferably above 4. The pH of the slurry is preferably not higher than 7, because slurries with a higher pH can be difficult to handle. The pH can be adjusted by adding a base (e.g. NaOH or $NH_4OH$) to the slurry. The time period between the pH adjustment and shaping preferably is 30 minutes or less, more preferably less than 5 minutes, and most preferably less than 3 minutes. At this step, the solids content of the slurry preferably is about 10 to about 45 wt %, more preferably about 15 to about 40 wt %, and most preferably about 25 to about 35 wt %.

The slurry is then shaped. Suitable shaping methods include spray-drying, pulse drying, pelletising, extrusion (optionally combined with kneading), beading, or any other conventional shaping method used in the catalyst and absorbent fields or combinations thereof. A preferred shaping method is spray-drying. If the catalyst is shaped by spray-drying, the inlet temperature of the spray-dryer preferably ranges from 300 to 600° C. and the outlet temperature preferably ranges from 105 to 200° C.

The Resulting Catalyst

The catalyst so obtained has exceptionally good attrition resistance and accessibility. Therefore, the invention also relates to a catalyst obtainable by the process according to the invention. The catalyst is generally a particulate FCC catalyst composition with increased iron resistivity comprising one or more zeolites, at least one alumina component, at least one silica component, and being essentially free of clay. Further, the catalyst may generally comprise about 1 to about 50% one or more zeolites, about 1 to about 45 wt % quasicrystalline boehmite, about 1 to about 45 wt % microcrystalline boehmite, greater than about 0-40 wt % non-peptizable alumina comprising gamma or alpha or chi phase alumina or gibbsite, about 1 wt % to about 20 wt % sodium stabilized silica, and about 0-20 wt % low sodium or acid or ammonia stabilized colloidal silica or poly silicic acid and essentially free of clay.

These catalysts can be used as FCC catalysts or FCC additives in hydroprocessing catalysts, alkylation catalysts, reforming catalysts, gas-to-liquid conversion catalysts, coal conversion catalysts, hydrogen manufacturing catalysts, and automotive catalysts. The invention therefore also relates to the use of these catalyst obtainable by the process of the invention as catalyst or additive in fluid catalytic cracking, hydroprocessing, alkylation, reforming, gas-to-liquid conversion, coal conversion, and hydrogen manufacturing, and as automotive catalyst The process of the invention is particularly applicable to Fluid Catalytic Cracking (FCC). In the FCC process, the details of which are generally known, the catalyst, which is generally present as a fine particulate comprising over 90 wt % of the particles having diameters in the range of about 5 to about 300 microns. In the reactor portion, a hydrocarbon containing feedstock as described earlier is gasified and directed upward through a reaction zone, such that the particulate catalyst is entrained and fluidized in the hydrocarbon feedstock stream. The hot catalyst, which is coming from the regenerator, reacts with the hydrocarbon feed which is vaporized and cracked by the catalyst. Typically temperatures in the reactor are 400-650° C. and the pressure can be under reduced, atmospheric or superatmospheric pressure, usually about atmospheric to about 5 atmospheres. The catalytic process can be either fixed bed, moving bed, or fluidized bed, and the hydrocarbon flow may be either concurrent or countercurrent to the catalyst flow. The process of the invention is also suitable for TCC (Thermofor catalytic cracking) or DCC (Deep Catalytic Cracking) or HSFCC. In addition, the hydrocarbon feedstock may include a blend of vegetable oils (soya bean, canola, corn, palm, rape seed, etc.), waste oils, tallow, biowaste and/or pyrolysis or other oils (e.g., Fischer Tropsch liquids) derived by any thermal or other treatment of biomass, or plastics, sewage, municipal waste, agriculture waste, or other suitable organic mass waste and combinations thereof. A unique feature of the invention is that the catalyst is essentially free of clay and comprises more than two alumina sources

EXAMPLES

The attrition resistance of the catalysts was measured using a method substantially based on ASTM 5757 Standard Test Method for Determination of Attrition and Abrasion of Powdered Catalysts by Air Jets, the results from which indicate that the more attrition resistant the catalyst is the lower the resulting attrition index value observed when testing a material using the above-referenced method.

The accessibility of the catalysts prepared according to the examples below was measured by adding 1 g of the catalyst to a stirred vessel containing 50 ml vacuum gas oil diluted in toluene. The solution was circulated between the vessel and a spectrophotometer, in which process the VGO-concentration was continuously measured.

Prior to any lab testing the catalyst must be deactivated to simulate catalyst in a refinery unit, this is typically done with steam and metal contaminants. These catalysts were deactivated with Fe, Ni, V and Ca contaminants as described in the previous literature (Applied Catalysis A: General 249 (2003) 69-80) (which is incorporated herein by reference) in a modified cyclic deactivation mode with lower steam partial pressure and temperature. Like cyclic deactivation, the catalyst is exposed to cracking and regeneration cycles with a feed containing metal contaminants. It is an industrially recognized deactivation procedure to simulate the Fe deactivation in the lab scale.

Example 1

As shown in Table 1 below, the example 1 compares the replacement of clay with additional non-peptizable microcrystalline boehmite and an alumina with a portion being chi phase. One example, Experimental-1, was made according to the present invention and the methods disclosed herein. In addition to three aluminas, sodium stabilized colloidal silica and acid stabilized colloidal silica were used for binding purposes. The resulted catalyst showed comparable attrition with improved accessibility to reference catalyst with clay. The Fe tolerance of this catalyst was validated by subjecting to lab scale deactivation as described in the literature (Applied Catalysis A: General 249 (2003) 69-80) with Fe, Ca, Ni and V metals. The essentially clay free catalyst showed higher accessibility than reference catalyst after the Fe deactivation, indication of better Fe tolerance. The better Fe tolerance of the essentially clay free catalyst was revealed in better bottoms upgrading in the ACE performance evaluation. The upgraded bottoms were converted into high value gasoline and LCO fractions and all other key components were either comparable or better than the reference catalyst.

TABLE 1

| | Reference - 1 | Experimental - 1 |
|---|---|---|
| Quasicrystalline Boehmite | 30 | 32 |
| Microcrystalline Boehmite | 15 | 27 |
| Basic colloidal silica | 1.5 | 1.5 |
| Total Zeolite | 23 | 23 |
| Acidic colloidal silica | 0 | 11.5 |
| Alumina with Chi phase | | 5 |
| Clay | 30.5 | 0 |
| | Fresh Physical Properties | |
| ABD(g/mL) | 0.79 | 0.76 |
| AI_LA | 1.85 | 1.69 |
| Accessibility (Fresh Catalyst) | 10 | 13.6 |
| Accessibility (Deactivated catalyst) | 7.5 | 12.2 |
| | Selectivity @ Constant Conversion | |
| 650° F.+ | 6.73 | 6.59 |

Example 2

In the below example, clay was replaced with gibbsite or alpha alumina. Experimental 2 and 3 were made according to the present invention and the methods disclosed herein. The experimental catalysts have three different alumina (quasicrystalline boehmite, microcrystalline boehmite and gibbsite or alpha alumina) and two different colloidal silica. The iron tolerance of these essentially clay free catalysts are higher as indicated by higher accessibility than the reference catalyst after lab scale deactivation with Fe, Ca, Ni and V metals. Again, the benefits of higher accessibility in essentially clay free catalysts are confirmed by better bottoms upgrading in ACE performance evaluation.

TABLE 2

| | Reference - 2 | Experimental - 2 | Experimental - 3 |
|---|---|---|---|
| Quasicrystalline Boehmite | 31 | 31 | 31 |
| Microcrystalline Boehmite | 18 | 18 | 18 |
| Basic colloidal silica | 1.5 | 1.5 | 1.5 |
| Total Zeolite | 26 | 26 | 18 |
| Acidic colloidal silica | | 12 | 10 |
| Gibbsite | | 11.5 | |
| Alpha alumina | | | 13.5 |
| Clay | 23.5 | 0 | 0 |
| | Fresh Physical Properties | | |
| ABD(g/mL) | 0.74 | 0.71 | 0.79 |
| Attrition | 1.47 | 2.92 | 1.03 |
| Accessibility (Fresh Catalyst) | 10.8 | 15.4 | 11.5 |
| Accessibility (Deactivated catalyst) | 6.3 | 11.5 | 9.0 |
| | Selectivity @ Constant Conversion | | |
| 650° F.+ | 6.84 | 6.65 | 6.74 |

Example 3

In the below example, clay was replaced with amorphous alumina containing Chi phase and gibbsite. Sodium stabilized colloidal silica and sodium stabilized poly silicic acid were used. Experimental 4 and 5 were made according to the present invention and the methods disclosed herein. The experimental catalysts have three different alumina (quasicrystalline boehmite, microcrystalline boehmite and gibbsite or Chi alumina) and two different colloidal silica (sodium stabilized colloidal silica and sodium containing poly silicic acid). The iron tolerance of these essentially clay free catalysts are higher as indicated by higher accessibility than the reference catalyst after lab scale deactivation with Fe, Ca, Ni and V metals. The benefits of higher accessibility retention in essentially clay free catalysts are confirmed by better bottoms upgrading in ACE performance evaluation.

TABLE 3

| | Reference - 3 | Experimental - 4 | Experimental - 5 |
|---|---|---|---|
| Quasicrystalline Boehmite | 30 | 32 | 32 |
| Microcrystalline Boehmite | 15 | 28.5 | 15 |
| Basic colloidal silica | 1.5 | 4 | 4 |
| Total zeolite | 23 | 23 | 23 |
| Alumina with Chi phase | | 6 | 6 |
| Gibbsite | | | 13.5 |
| Sodium stabilized poly silicic acid | | 7.5 | 7.5 |
| Kaolin | 30.5 | 0 | 0 |
| | Fresh Physical Properties | | |
| ABD(g/mL) | 0.68 | 0.74 | 0.71 |
| Attrition | 2.48 | 2.45 | 2.01 |
| Accessibility (Fresh Catalyst) | 14 | 20.1 | 22.9 |
| | Deactivated Catalyst Properties | | |
| Accessibility (Deactivated Catalyst) | 5.4 | 19.3 | 18.3 |
| | Selectivity @ Constant Conversion | | |
| 650° F.+ | 7.29 | 7.09 | 6.92 |

The invention claimed is:

1. A particulate FCC catalyst composition comprising about 1 to about 50 wt % one or more zeolites, about 1 to about 45 wt % quasicrystalline boehmite, about 1 to about 45 wt % microcrystalline boehmite, greater than about 0-40 wt % non-peptizable alumina comprising gamma or alpha or chi phase alumina or gibbsite, about 1 wt % to about 20 wt % sodium stabilized silica, and about 0-20 wt % low sodium or acid or ammonia stabilized colloidal silica or poly silicic acid and essentially free of clay.

2. The particulate FCC catalyst composition of claim 1 wherein the quasicrystalline boehmite alumina has the characteristics sharp XRD peaks at 2θ values at about 14, 28 and 38 degrees corresponding to the (020), (021), and (041) plane reflections.

3. The particulate FCC catalyst composition of claim 1 wherein the microcrystalline boehmite alumina has the characteristics XRD peaks of 2θ values at about 14, 28 and 38 degrees corresponding to the (020), (021), and (041) plane reflections.

4. The particulate FCC catalyst composition of claim 1 wherein the non-peptizable alumina comprising alpha-alumina has the characteristics XRD peaks of 2θ values at about 25.5, 35, 43.5, 57.5 and 69 degrees corresponding to (012), (104), (115), (116) and (030) plane reflections.

5. The particulate FCC catalyst composition of claim 1 wherein the non-peptizable alumina comprising gamma-alumina has the characteristics XRD peaks of 2θ values at about 37.6, 45.8 and 67 degrees corresponding to the (311), (400) and (440) plane reflections.

6. The particulate FCC catalyst composition of claim 1 wherein the non-peptizable alumina comprising chi phase has the characteristics XRD peaks of 2θ values at about 37, 43, and 67 degrees.

7. The particulate FCC catalyst composition of claim 1 wherein the non-peptizable alumina comprising gibbsite-alumina has the characteristics XRD peaks of 2θ values at about 18, 20.3 and 38 degrees.

8. A particulate FCC catalyst composition comprising one or more zeolites. quasicrystalline boehmite, microcrystalline boehmite, non-peptizable alumina comprising gamma or alpha or chi phase alumina or gibbsite, sodium stabilized silica, and low sodium or acid or ammonia stabilized colloidal silica or poly silicic acid, and essentially free of clay.

* * * * *